UNITED STATES PATENT OFFICE.

WILHELM EPSTEIN AND EMIL ROSENTHAL, OF FRANKFORT-ON-THE-MAIN, GERMANY.

BROWN SULFUR DYE AND PROCESS OF MAKING SAME.

SPECIFICATION forming part of Letters Patent No. 681,689, dated September 3, 1901.

Application filed March 7, 1901. Serial No. 50,207. (No specimens.)

*To all whom it may concern:*

Be it known that we, WILHELM EPSTEIN and EMIL ROSENTHAL, subjects of the Emperor of Germany, and residents of Frankfort-on-the-Main, Germany, have invented certain new and useful Improvements in Brown Sulfur Dyes and Processes of Making Same, of which the following is a specification.

This invention relates to a brown sulfur dye and process of making same by heating with sulfur and sodium sulfid certain nitro compounds of benzidin and of its substitution products. Of these nitro compounds the one derived from the benzidin itself has been formerly described by Taeuber. (*Ber. d. Deutsch. Chem. Gesellschaft*, Vol. 23, p. 795.) This "m-dinitrobenzidin" is obtained by adding two molecules of nitrate of potassium to a solution of one molecule of benzidin in concentrated sulfuric acid. The m-dinitrobenzidin in a pure state melts at 214° centigrade. Taeuber has proved it to be a derivative of the o-o' dinitrodiphenyl. Its formula is therefore

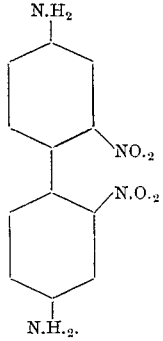

If tertiary benzidins be nitrated in just the same way—that is, by adding two molecules of nitrate of potassium to the solutions of the bases in sulfuric acid—the analogous nitro compounds are obtained. Thus the tetramethylbenzidin yields a "m-dinitro-tetramethylbenzidin" which after purification melts at 231° centigrade, while the tetraethylbenzidin yields a "m-dinitro-tetraethylbenzidin" which crystallizes in red needles, melting at 114° centigrade. Further useful nitro compounds or mixtures of such can be prepared if the sulfuric-acid solutions of the tertiary benzidins be treated with a quantity of nitrate equivalent to more than two molecules. If, for instance, a solution of tetramethylbenzidin in sulfuric acid be treated first with two molecules of nitrate of potassium and then, the mixture having been agitated for some hours in order to complete the forming of the dinitro compound, two more molecules of nitrate be added, a poly-nitro-tetramethylbenzidin is obtained. This nitro compound distinctly differs from the di-nitro-tetramethylbenzidin by being completely precipitated on diluting the sulfuric-acid solution with ice or water.

If the above-named nitro derivatives are heated together with sulfur and sodium sulfid, coloring-matters are obtained which die unmordanted cotton in fast shades, varying according to the nitro compound used, from a yellowish brown to reddish brown and black. In order to produce, for instance, a clear yellowish brown, one part of m-dinitro-tetramethylbenzidin is heated together with two parts of sulfur and five parts of sodium sulfid, the temperature being gradually raised to about 260° to 265° centigrade until the color of a sample does not increase any more. A dark reddish brown is obtained by heating gradually to about 280° to 285° centigrade one part of poly-nitro-tetramethylbenzidin, two parts of sulfur, and eight parts of sodium sulfid, while a mixture of one part of m-dinitrobenzidin, two parts of sulfur, and six parts of sodium sulfid yields a deep brownish black. The shades of the colors produced can be altered besides by varying the proportions of sulfur and of sodium sulfid used in the process. More sodium sulfid employed in proportion to the quantity of sulfur yields darker shades. The coloring-matters thus obtained appear in a dry state as dark powders, readily soluble in cold water and precipitated from this solution by acids. The color of the solutions varies from yellowish brown to red and violet.

The dyestuffs dye unmordanted vegetable fibers from a hot or cold bath containing common salt, an addition of sodium sulfid to the bath not being required. The shades vary from yellowish brown to reddish brown and black and resist severe soaping, acids, and alkalies. They are intensified by passing the dyed fabric through acetic acid and bichromate, copper sulfate, or similar oxidizing agents.

We claim—

1. The herein-described process for the manufacture of sulfurized coloring-matters by heating with sulfur and alkali-sulfid such nitro compounds of benzidins, which are obtained in treating the sulfuric-acid solutions of the respective bases with at least two molecules of potassium nitrate as and for the purpose set forth.

2. As new products the coloring-matters belonging to the class of sulfurized dyestuffs, which can be obtained by heating nitro derivatives of benzidins with sulfur and alkali-sulfid and which are easily soluble in cold water, being precipitated from this solution by acids, and dye unmordanted cotton from hot or cold baths, yielding shades ranging from yellowish brown to brownish black.

In testimony whereof we have signed our names to this specification in the presence of two subscribing witnesses.

WILHELM EPSTEIN.
EMIL ROSENTHAL.

Witnesses:
MICHAEL VOLK,
JEAN GRUND.